United States Patent
Price et al.

(10) Patent No.: US 7,340,183 B2
(45) Date of Patent: Mar. 4, 2008

(54) OPTICAL COMMUNICATIONS SYSTEMS, DEVICES, AND METHODS

(75) Inventors: Alistair J. Price, Columbia, MD (US); William Radtke, Ellicott City, MD (US); David F. Smith, Ellicott City, MD (US)

(73) Assignee: Broadwing Corporation, Austin, TX (US)

( * ) Notice: Subject to any disclaimer, the term of this patent is extended or adjusted under 35 U.S.C. 154(b) by 628 days.

(21) Appl. No.: 10/227,574

(22) Filed: Aug. 23, 2002

(65) Prior Publication Data

US 2003/0025971 A1   Feb. 6, 2003

Related U.S. Application Data

(63) Continuation-in-part of application No. 09/441,805, filed on Nov. 17, 1999, now abandoned.

(60) Provisional application No. 60/314,600, filed on Aug. 24, 2001, provisional application No. 60/108,751, filed on Nov. 17, 1998.

(51) Int. Cl.
*H04B 10/04* (2006.01)

(52) U.S. Cl. .................. 398/187; 398/76; 398/77; 398/189

(58) Field of Classification Search ............ 398/76–77, 398/45–56, 182–190, 16–19; 385/16–19
See application file for complete search history.

(56) References Cited

U.S. PATENT DOCUMENTS

| | | | |
|---|---|---|---|
| 4,545,076 A | | 10/1985 | Biard et al. |
| 4,663,767 A | | 5/1987 | Bodlaj et al. |
| 5,301,058 A | | 4/1994 | Olshansky |
| 5,381,446 A | * | 1/1995 | McIntosh .................. 375/150 |
| 5,446,571 A | * | 8/1995 | Shabeer ..................... 359/107 |
| 5,694,232 A | | 12/1997 | Parsay et al. |
| H1702 H | | 1/1998 | Esman et al. |
| 5,867,534 A | * | 2/1999 | Price et al. ................. 375/286 |
| 6,088,494 A | | 7/2000 | Keck et al. |
| 6,091,744 A | | 7/2000 | Sorin et al. |
| 6,118,566 A | | 9/2000 | Price |
| 6,393,050 B1 | * | 5/2002 | Liu ........................... 375/219 |

(Continued)

FOREIGN PATENT DOCUMENTS

| | | |
|---|---|---|
| EP | 0 701 338 A | 3/1996 |
| EP | 1 076 430 A | 2/2001 |
| WO | WO 01/10156 A | 2/2001 |

OTHER PUBLICATIONS

International Search Report for PCT/US02/26858.
International Search Report for PCT/US02/27117.
Communication from the European Patent Office Pursuant to Article 96(2), Oct. 11, 2006.
Supplemental European Search Report for Application No. EP 02 76 8674, Jun. 28, 2006.

Primary Examiner—Dzung Tran

(57) ABSTRACT

A method of transmitting an optical communications signal, comprising receiving a first signal, encoding the signal with a differential or duobinary encoding scheme, encoding the signal with an oscillating signal component, and sub-carrier modulating the signal onto a sub-carrier of an optical carrier signal. The invention also relates to corresponding systems and apparatuses.

20 Claims, 19 Drawing Sheets

U.S. PATENT DOCUMENTS

| | | | |
|---|---|---|---|
| 6,522,439 B2 * | 2/2003 | Price et al. | 398/194 |
| 6,522,662 B1 * | 2/2003 | Liu | 370/465 |
| 6,556,581 B1 * | 4/2003 | He et al. | 370/419 |
| 6,674,929 B2 | 1/2004 | Feng et al. | |
| 2002/0089726 A1 | 7/2002 | He et al. | |
| 2002/0131689 A1 | 9/2002 | Feuer et al. | |
| 2002/0181832 A1 | 12/2002 | Feng et al. | |
| 2003/0035619 A1 | 2/2003 | Pfeiffer | |

* cited by examiner

OPTICAL COMMUNICATIONS SYSTEMS, DEVICES, AND METHODS

CROSS-REFERENCE TO RELATED APPLICATIONS

This application claims priority from U.S. provisional patent application No. 60/314,600, filed Aug. 24, 2001, and from U.S. patent application Ser. No. 09/441,805, filed Nov. 17, 1999, which claims priority from U.S. provisional patent application No. 60/108,751, filed Nov. 17, 1998, now abandoned, all of which are incorporated herein by reference.

STATEMENT REGARDING FEDERALLY-SPONSORED RESEARCH AND DEVELOPMENT

Not applicable.

BACKGROUND OF THE INVENTION

The present invention is directed generally to the transmission of signals in optical communications systems. More particularly, the invention relates to systems, devices, and methods for producing upconverted modulated optical signals.

The development of digital technology provided the ability to store and process vast amounts of information. While this development greatly increased information processing capabilities, it was recognized that in order to make effective use of information resources it was necessary to interconnect and allow communication between information resources. Efficient access to information resources requires the continued development of information transmission systems to facilitate the sharing of information between resources. One effort to achieve higher transmission capacities has focused on the development of optical transmission systems. Optical transmission systems can provide high capacity, low cost, low error rate transmission of information over long distances.

The transmission of information over optical systems is typically performed by imparting the information in some manner onto an optical carrier by varying characteristics of the optical carrier. In most optical transmission systems, the information is imparted by using an information data stream to either directly or externally modulate an optical carrier so that the information is imparted at the carrier frequency or on one or more sidebands, with the later technique sometimes called upconversion or sub-carrier modulation ("SCM").

SCM techniques, such as those described in U.S. Pat. Nos. 4,989,200, 5,432,632, and 5,596,436, generally produce a modulated optical signal in the form of two mirror image sidebands at wavelengths symmetrically disposed around the carrier wavelength. Generally, only one of the mirror images is required to carry the signal and the other image is a source of signal noise that also consumes wavelength bandwidth that would normally be available to carry information. Similarly, the carrier wavelength, which does not carry information in an SCM system, can be a source of noise that interferes with the subcarrier signal. Modified SCM techniques have been developed to eliminate one of the mirror images and the carrier wavelength. However, "traditional" SCM techniques do not work well at high bit rates (e.g., greater than 2.5 gigabits per second). For example, mixer linearity, frequency flatness, frequency bandwidth, and group delay tend to be problematic. It is also difficult to keep power levels balanced and well controlled. Such problems and difficulties can result in significant performance degradation and/or increased cost. Modified SCM techniques have also been disclosed to utilize Manchester encoding in place of electrical carriers, such as described in U.S. Pat. Nos. 5,101,450 and 5,301,058.

Initially, single wavelength carriers were spatially separated by placing each carrier on a different fiber to provide space division multiplexing ("SDM") of the information in optical systems. As the demand for capacity grew, increasing numbers of information data streams were spaced in time, or time division multiplexed ("TDM"), on the single wavelength carrier in the SDM system as a means to better use the available bandwidth. The continued growth in demand has spawned the use of multiple wavelength carriers on a single fiber using wavelength division multiplexing ("WDM").

In WDM systems, further increases in transmission capacity can be achieved not only by increasing the transmission rate of the information on each wavelength, but also by increasing the number of wavelengths, or channel count, in the system. However, conventional systems already have the capacity to transmit hundreds of channels on a single fiber, and that number will continue to increase. As such, the cost of transmitters, receivers, and other devices can constitute a large portion of a system's cost. Therefore, the size and cost of systems will increase significantly as the number of WDM channels increase. Accordingly, there is a need to reduce the cost and size of devices in optical systems while at the same time maintaining or increasing system performance.

BRIEF SUMMARY OF THE INVENTION

The systems, devices, and methods of the present invention address the above-stated need for lower cost, higher capacity, longer distance optical communications systems, devices, and methods. The present invention is directed to improved systems, devices, and methods for producing sub-carrier modulated optical signals. The present invention can be employed, for example, in multi-dimensional optical networks, point to point optical networks, or other devices or systems which can benefit from the improved performance afforded by the present invention.

One embodiment of the present invention is a transmitter including an optical carrier source, an electrical to optical converter, a parser, and first and second Manchester encoders. The electrical to optical converter has an optical input connected to the optical carrier source, an optical output, and first and second electrical data inputs. The parser has a data input and first and second data outputs. The first Manchester encoder has a data input connected to the first data output of the parser and an encoded data output connected to the first electrical input of the electrical to optical converter. The second Manchester encoder has a data input connected to the second data output of the parser and an encoded data output connected to the second electrical input of the electrical to optical converter.

Another embodiment of the present invention includes two or more optical carrier sources, and two or more corresponding electrical to optical converters. In some embodiments, the optical carrier sources produce optical carriers with the same optical wavelength, and in other embodiments the optical carrier sources produce optical carriers having different wavelengths.

Other embodiments of the present invention utilize other variations and combinations of devices, such as forward error correction encoders, differential encoders, filters, interfaces, and multiplexers. In other embodiments, the data signal is separated into two or more lower bit rate signals for at least a portion of the transmitter. In other embodiments, the parser produces more than two parsed signals.

Those and other embodiments of the present invention, as well as receivers, systems, and methods according to the present invention, will be described in the following detailed description. The present invention addresses the needs described above in the description of the background of the invention by providing improved systems, devices, and methods. These advantages and others will become apparent from the following detailed description.

BRIEF DESCRIPTION OF THE DRAWINGS

Embodiments of the present invention will now be described, by way of example only, with reference to the accompanying drawings, wherein.

DETAILED DESCRIPTION OF THE INVENTION

Figure 1:
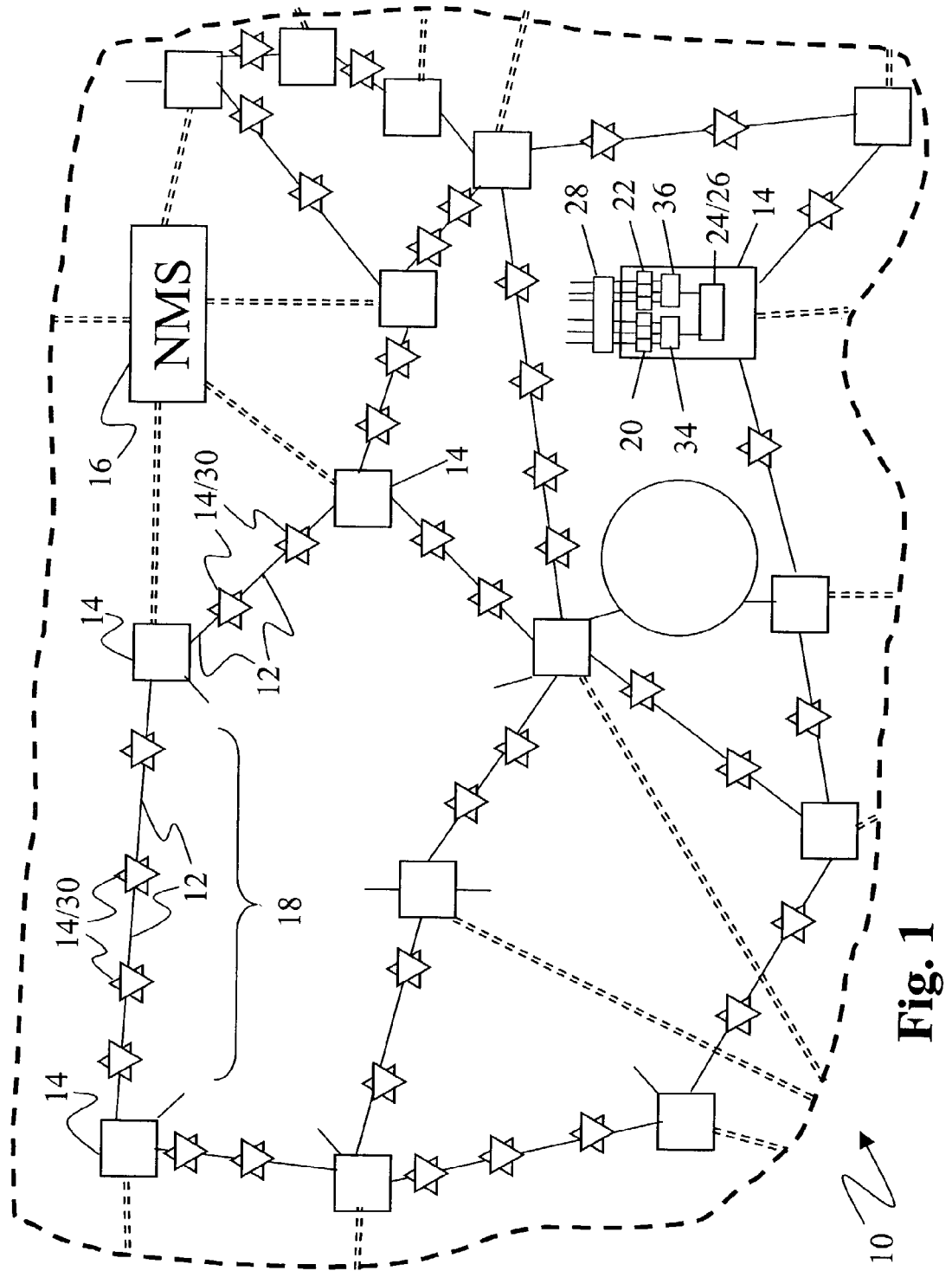
FIGS. 1 and 2 show examples optical communications systems.

FIG. 1 shows an optical communications system 10 which includes optical paths 12 connecting network elements 14. Advantages of the present invention can be realized with many system 10 configurations and architectures, such as an all optical network, one or more point to point links, one or more rings, a mesh, other architectures, or combinations of architectures. The system 10 illustrated in FIG. 1 is a multi-dimensional network, which can be implemented, for example, as an all optical mesh network, as a collection of point to point links, or as a combination of architectures. The system 10 can employ various transmission schemes, such as space, time, code, frequency, phase, polarization, and/or wavelength division multiplexing, and other types and combinations of multiplexing schemes. The system 10 can also include more or less features than those illustrated herein, such as by including a network management system ("NMS") 16 and changing the number, location, content, configuration, and connection of network elements 14.

The optical paths 12 can include guided and unguided paths or waveguides, such as one or more optical fibers, ribbon fibers, and free space devices, and can interconnect the network elements 14 establishing links 18 and providing optical communication paths through the system 10. The paths 12 can carry one or more uni- or bi-directionally propagating optical signal channels or wavelengths. The optical signal channels can be treated individually or as a single group, or they can be organized into two or more wavebands or spectral groups, each containing one or more optical signal channel.

The network elements 14 can include one or more signal processing devices including one or more of various optical and/or electrical components. The network elements 14 can perform network functions or processes, such as switching, routing, amplifying, multiplexing, combining, demultiplexing, distributing, or otherwise processing optical signals. For example, network elements 14 can include one or more transmitters 20, receivers 22, switches 24, add/drop multiplexers 26, interfacial devices 28, amplifiers 30, multiplexers/combiners 34, and demultiplexers/distributors 36, as well as filters, dispersion compensating and shifting devices, monitors, couplers, splitters, and other devices. One embodiment of one network element 14 is illustrated in FIG. 1, although many other variations and embodiments of network elements 14 are contemplated. Additional examples of network elements 14 are described in U.S. patent application Ser. Nos. 09/817,478, filed Mar. 26, 2001, and 09/253,819, filed Feb. 19, 1999, both of which are incorporated herein by reference.

The optical transmitters 20 and receivers 22 are configured respectively to transmit and receive optical signals including one or more information carrying optical signal wavelengths, or channels, via the optical paths 12. The transmitters 20 include an optical carrier source that provides an optical carrier and can utilize, for example, coherent or incoherent sources, and narrow band or broad band sources, such as sliced spectrum sources, fiber lasers, semiconductor lasers, light emitting diodes, and other optical sources. The transmitters 20 often include a narrow bandwidth laser as the optical carrier source. The optical transmitter 20 can impart information to the optical carrier by directly modulating the optical carrier source or by externally modulating the optical carrier. Alternatively, the information can be upconverted onto an optical wavelength to produce the optical signal, such as by utilizing Manchester encoding as described hereinbelow. Examples of optical transmitters 20 are described in U.S. Pat. No. 6,118,566, issued Sep. 12, 2000, which is incorporated herein by reference.

Similarly, the optical receiver 22 can include various detection techniques, such as coherent detection, optical filtering, and direct detection. Tunable transmitters 20 and receivers 22 can be used to provide flexibility in the selection of wavelengths used in the system 10.

The switches 24 can take many forms and can have different levels of "granularity". "Granularity" refers to the resolution or precision with which the switching is performed. For example, WDM switches 24 can switch groups of wavelengths, individual wavelengths, or portions of wavelengths. Before being switched, the signals can be demultiplexed into the appropriate level of granularity, and after being switched the signals can be multiplexed into the desired format, using the same or different modulation schemes, wavelengths, or other characteristics.

Switches 24 can have electrical, optical, or electrical/optical switch "fabrics". The switch "fabric" describes the domain and/or manner in which the signal switching occurs. Switches 24 having an electrical fabric convert incoming optical signals into electrical signals, the electrical signals are switched with electronic equipment, and the switched electrical signals are converted back into optical signals. Such switching is often referred to as "O-E-O" ("optical-electrical-optical") switching. In contrast, switches 24 having an optical switch fabric perform the switching with the signals in the optical domain. However, switches 24 having an optical switch fabric can still perform O-E-O conversions, such as when demultiplexing or multiplexing optical signals, or in other related interface devices or operations.

There are many optical switch fabrics, some of which use micro-electromechanical systems ("MEMS"), such as small, electrically-controlled mirrors, to selectively reflect an incoming optical signal to a desired output. Other optical switch fabrics use a variable index of refraction device to controllably change the index of refraction of an optical signal path, such as by forming a gas pocket in an optically transparent liquid medium, in order to change the direction of the optical signal. Yet another example of an optical switch fabric is the use of an optical path in which the optical gain and/or loss can be controlled so that an optical signal can be either passed or blocked. Some examples of switches 24 having an optical fabric are described in U.S. patent application Ser. No. 09/119,562, filed Jul. 21, 1998, and No. 60/150,218, filed Aug. 23, 1999, and PCT Patent Application PCT/US00/23051, filed Aug. 23, 2000, all of which are incorporated herein by reference.

Switches 24 can be grouped into two categories: interfacial switches and integrated switches. Interfacial switches 24, sometimes referred to as "dedicated" switches, perform one or more O-E-O conversions of the signals. The O-E-O conversions can be either in the switch 24 itself or in a related component, such as a multiplexer 34 or demultiplexer 36. Interfacial switches 24 are located within or at the periphery of networks 10 and point to point links 18, such as between two or more point to point links 18, between two or more networks 10, or between a network 10 and a point to point link 18. Interfacial switches 24 optically separate the links 18 and/or networks 10 because optical signals are converted into electrical form before being passed to the next optical link 18 or network 10. Interfacial switches 24 are a type of interfacial device 28, which is discussed in more detail hereinbelow. In contrast, integrated switches 24 are optically integrated into the network 10 and allow optical signals to continue through the network 10, via the integrated switch 24, without an O-E-O conversion. Integrated switches 24 are sometimes called "all-optical switches", "O-O " switches, or "O-O-O" switches. A switch 24 can have both an integrated switch 24 portion and a interfacial switch 24 portion, such that some signals are switched without an O-E-O conversion, while other signals are subjected to an O-E-O conversion.

Add/drop multiplexers 26 and other devices can function in a manner analogous to integrated switches 24 so that, in general, only optical signals which are being "dropped" from the network 10 are converted into electronic form. The remaining signals, which are continuing through the network 10, remain in the optical domain. As a result, optical signals in an all-optical system 10 (e.g., systems 10 having integrated switches 24 and integrated add/drop multiplexers 26) are not converted into electrical form until they reach their destination, or until the signals degrade to the point they need to be regenerated before further transmission. Of course, add/drop multiplexers 26 can also be interfacial devices 28 which subject signals to an O-E-O conversion.

Interfacial devices 28 optically separate and act as interfaces to and between optical networks 10 and/or point to point links 18. Interfacial devices 28 perform at least one optical to electrical ("O-E") or electrical to optical ("E-O") conversion before passing signals into or out of the link 18 or network 10. Interfacial device 28 can be located within or at the periphery of networks 10, such as between two or more networks 10, between two or more point to point links 18, and between networks 10 and point to point links 18. Interfacial devices 28 include, for example, cross-connect switches, IP routers, ATM switches, etc., and can have electrical, optical, or a combination of switch fabrics. Interfacial devices 28 can provide interface flexibility and can be configured to receive, convert, and provide information in one or more various protocols, encoding schemes, and bit rates to the transmitters 20, receivers 22, and other devices. The interfacial devices 28 also can be used to provide other functions, such as protection switching.

The optical amplifiers 30 can be used to provide signal gain and can be deployed proximate to other optical components, such as in network elements 14, as well as along the optical communications paths 12. The optical amplifiers 30 can include concentrated/lumped amplification and/or distributed amplification, and can include one or more stages. The optical amplifier can include doped (e.g. erbium, neodymium, praseodymium, ytterbium, other rare earth elements, and mixtures thereof) and Raman fiber amplifiers, which can be locally or remotely pumped with optical energy. The optical amplifiers 30 can also include other types of amplifiers 30, such as semiconductor amplifiers.

Optical combiners 34 can be used to combine the multiple signal channels into WDM optical signals for the transmitters 20. Likewise, optical distributors 36 can be provided to distribute the optical signal to the receivers 22. The optical combiners 34 and distributors 36 can include various multi-port devices, such as wavelength selective and non-selective ("passive") devices, fiber and free space devices, and polarization sensitive devices. Other examples of multi-port devices include circulators, passive, WDM, and polarization couplers/splitters, dichroic devices, prisms, diffraction gratings, arrayed waveguides, etc. The multi-port devices can be used alone or in various combinations with various tunable or fixed wavelength transmissive or reflective, narrow or broad band filters, such as Bragg gratings, Fabry-Perot and dichroic filters, etc. in the optical combiners 34 and distributors 36. Furthermore, the combiners 34 and distributors 36 can include one or more stages incorporating various multi-port device and filter combinations to multiplex, demultiplex, and/or broadcast signal wavelengths $\lambda_i$ in the optical systems 10.

The NMS 16 can manage, configure, and control network elements 14 and can include multiple management layers that can be directly and indirectly connected to the network elements 14. The NMS 16 can be directly connected to some network elements 14 via a data communication network (shown in broken lines) and indirectly connected to other network elements 14 via a directly connected network element and the optical system 10. The data communication network can, for example, be a dedicated network, a shared network, or a combination thereof. A data communications network utilizing a shared network can include, for example, dial-up connections to the network elements 14 through a public telephone system. Examples of an NMS 16 are described in U.S. patent application Ser. No. 60/177,625, filed Jan. 24, 2000, and PCT Patent Application PCT/US01/02320, filed Jan. 24, 2001, both of which are incorporated herein by reference.

Figure 2:
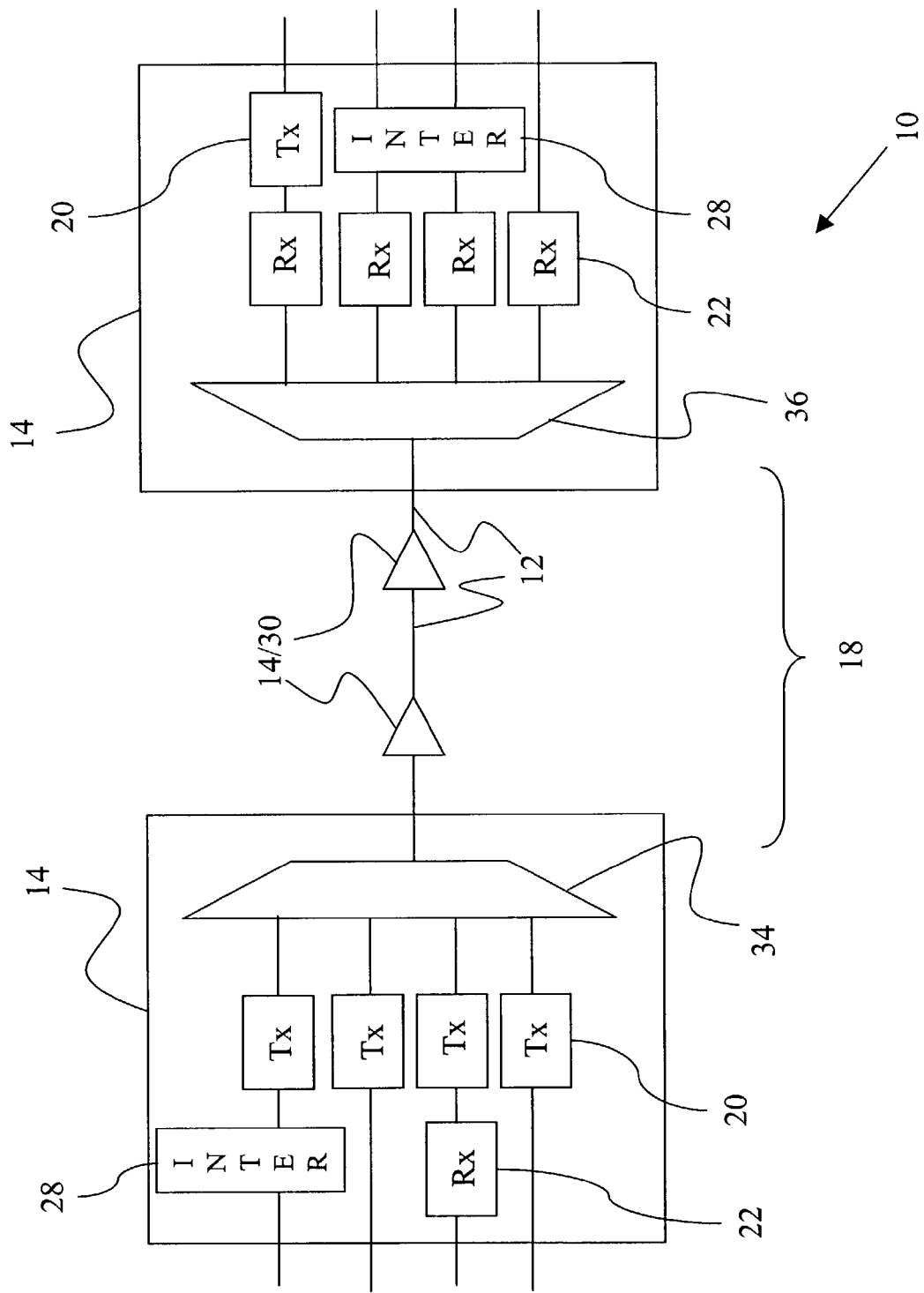

FIG. 2 shows another embodiment of the system 10 including a link 18 of four network elements 14. That system 10 can, for example, be all or part of a point to point system 10, or it may be part of a multi-dimensional, mesh, or other system 10. One or more of the network elements 14 can be connected directly to the network management system 16 (not shown). If the system 10 is part of a larger system, then as few as none of the network elements 14 can be connected to the network management system 16 and all of the network elements 14 can still be indirectly connected to the NMS 16 via another network element in the larger system 10.

Figure 3:
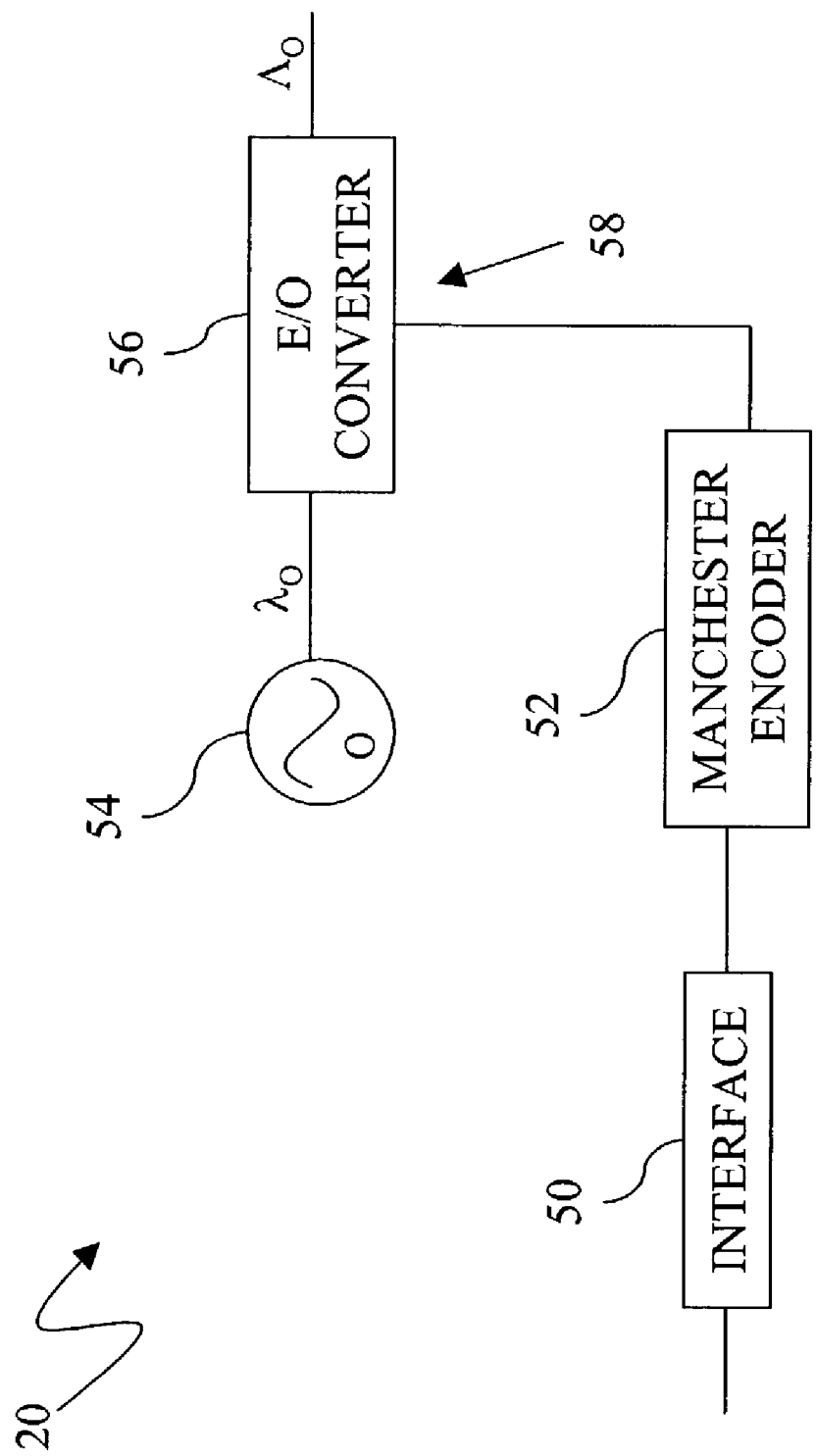
FIG. 3 shows an embodiment of a transmitter that can be used in the optical communications system.

FIG. 3 shows a transmitter 20 including an interface 50, a Manchester encoder 52, an optical carrier source 54, and an E/O converter 56 having a data input 58. The transmitter 20 can also include components other than those illustrated herein, such as amplifiers, phase shifters, isolators, filters, signal distorters, protocol processors, and other electrical, optical, and electro-optical components. The transmitter 20 can upconvert one or more data signals onto one or more sidebands of the optical carrier $\lambda_o$, without requiring the data signals to be modulated onto an electrical carrier source. The upconverted optical signal $\Lambda o$ of the present invention does not require a Manchester decoder at the receiver 22. Rather, the sideband signal can be received in a manner analogous to other upconverted data signals.

The interface 50 provides an interface for data signals to be transmitted and can provide a connection to other systems, networks, or links. The interface 50 can be a simple connector or it can be a more sophisticated device, such as one which performs SONET section monitoring and termination functions or other functions, such as transforming the format of the signals entering the system 10 (e.g., an optical to electrical converter or changing a signal from RZ to NRZ format), transforming a single stream of data into plural lower bit rate streams, etc. The interface 50 can be, for example, the receiver end of an optical short reach interface which receives and converts a high bit rate optical signal into two or more lower bit rate electrical signals. The conversion of a single, high bit rate signal into two or more lower bit rate signals is advantageous, for example, when a high bit rate signal can be processed more efficiently in several lower bit rate streams.

The Manchester encoder 52 encodes incoming data signals with a Manchester encoding scheme. The encoder 52 can be implemented, for example, as an integrated circuit, such as an application specific integrated circuit, a general purpose integrated circuit, a field programmable gate array, or other integrated circuits.

The Manchester encoding scheme typically encodes each bit of data as a two part bit code, with the first part of the bit code being the complement of the data, and the second part being the actual data. Other variations of Manchester encoding, such as where the second part of the bit code is the complement of the data, can also be used with the present invention. Furthermore, although the present invention will be described in terms of Manchester encoding, the present invention is applicable to other encoding schemes, including the modulation of data onto an electrical carrier, which reduce or transform the DC component of data signals and, thereby, provide for signal upconversion in accordance with the present invention. In some embodiments, the transmitter 20 can upconvert data onto one or more sidebands, or it can transmit data at the optical carrier wavelength $\lambda_o$. For example, the Manchester encoder 52 can be activated for upconversion and deactivated, so that data signals pass through unencoded, for transmission at the optical carrier wavelength $\lambda_o$. In other embodiments, the transmitter 20 can include a bypass circuit around the Manchester encoder 52 for transmission at the optical carrier wavelength $\lambda_o$.

The optical carrier source 54 provides an optical carrier having a center carrier wavelength $\lambda_o$, such as a continuous wave optical carrier, to the E/O converter 56. The optical carrier source 54 can include control circuits (not shown), such as drive and thermal control circuits, to control the operation of the optical carrier source 54.

The E/O converter 56 receives the optical carrier $\lambda_o$ from the optical carrier source 54 and receives electrical data signals at data input 58. The E/O converter 56 converts the electrical data signals into optical data signals $\Lambda_o$. The E/O converter 56 can provide the data on one or more sidebands of the optical carrier $\lambda_0$, which is sometimes referred to as "upconversion" or "subcarrier modulation". The E/O converter 56 can include, for example, one or more Mach-Zehnder interferometers, other interferometers, or other E/O converters.

Figure 4:
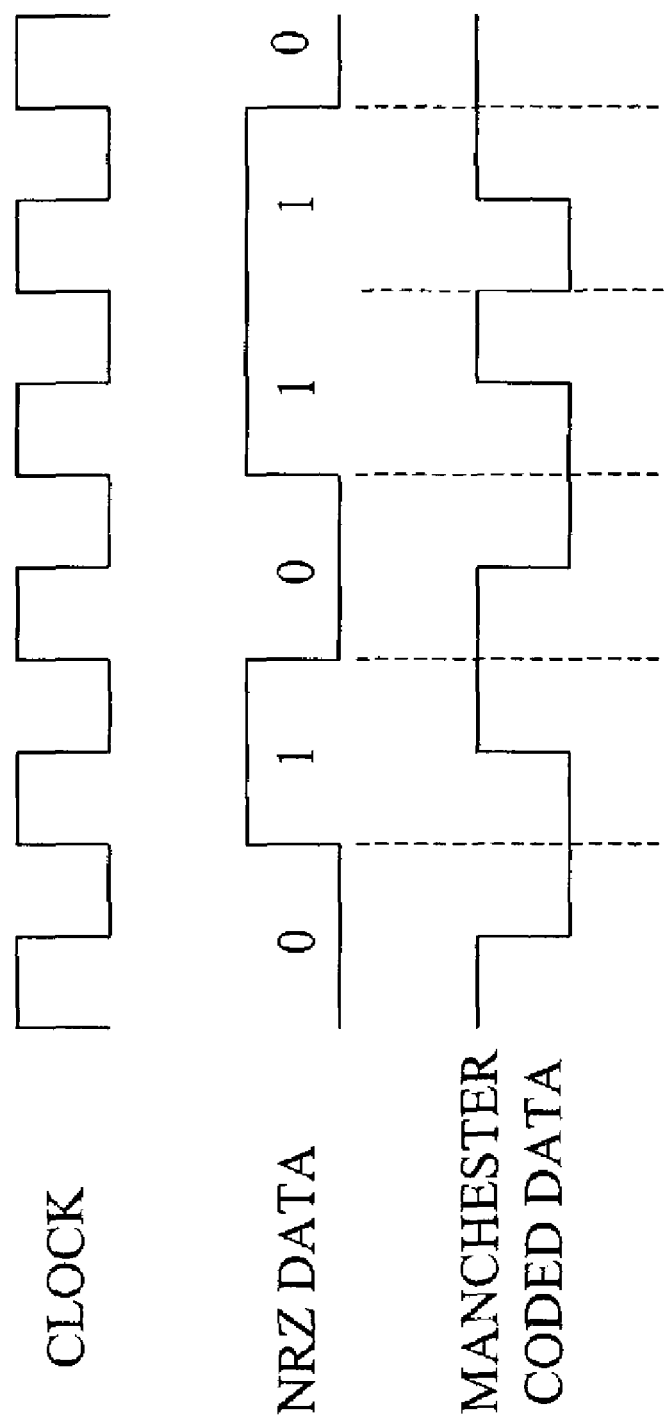
FIG. 4 shows timing diagrams illustrating one example of Manchester encoding.

FIG. 4 shows an example of Manchester encoded data, along with corresponding NRZ data and a clock signal. In that example the Manchester encoded data corresponds with data in NRZ format, although many forms of data can be Manchester encoded, including data in RZ format. In this example, the Manchester encoded data includes a two part bit code, with the first part of the bit code being the complement of the data, the second part being the actual data, and with a transition between the two parts. Other variations of Manchester encoding can also be used with the present invention. One form of Manchester encoding is specified in IEEE Standard 802.3. Other forms and variations of Manchester encoding also exist and are applicable to the present invention.

Figure 5:
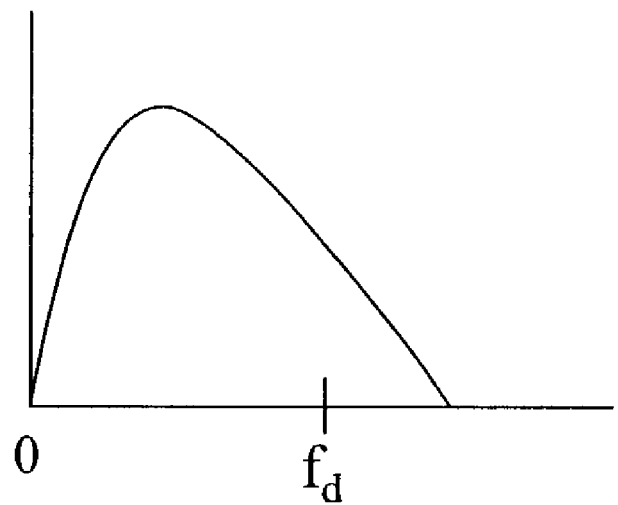
FIG. 5 shows one example of a frequency spectrum for a Manchester encoded signal.

FIG. 5 shows an example of Manchester encoded data in the frequency spectrum. Manchester encoded data typically has an asymmetrical frequency spectrum about data rate frequency $f_d$. Furthermore, the data rate frequency $f_d$ of the data signal affects the frequency spectrum of the Manchester encoded data, so that the greater the data rate $f_d$, the greater the spread of the frequency spectrum of the Manchester encoded signal. Because each bit of a Manchester encoded signal has a transition between states, Manchester encoded data has a frequency component equal to the bit rate. As a result, the electrical data signals are upconverted onto one or more sidebands of the optical carrier $\lambda_o$ at the electrical to optical converter 56. Furthermore, the frequency spectrum of the Manchester encoded signal will affect the shape and offset of the sidebands.

Figure 6:
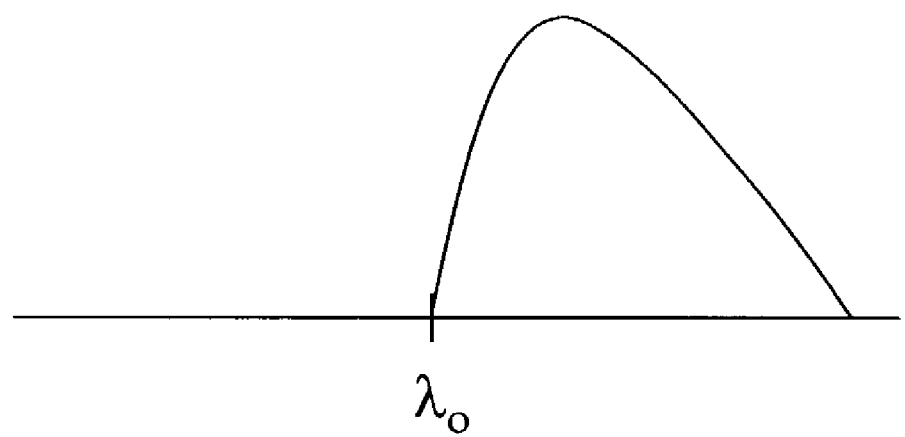
FIG. 6 shows one example of a frequency spectrum for an upconverted optical signal generated from the Manchester encoded signal of FIG. 5.

FIG. 6 shows a signal profile of the optical data signal $\Lambda_o$ when the Manchester encoded data signal of FIG. 5 is input to the E/O converter 56. In that example, the Manchester encoded data signal is upconverted onto a single sideband of the optical carrier $\lambda_o$ and the optical carrier $\lambda_o$ is suppressed. The present invention can also be used with other upconversion formats. For example, the carrier does not have to be suppressed, and the Manchester encoded data signals can be upconverted in other formats, such as double sideband signals.

Figure 7:
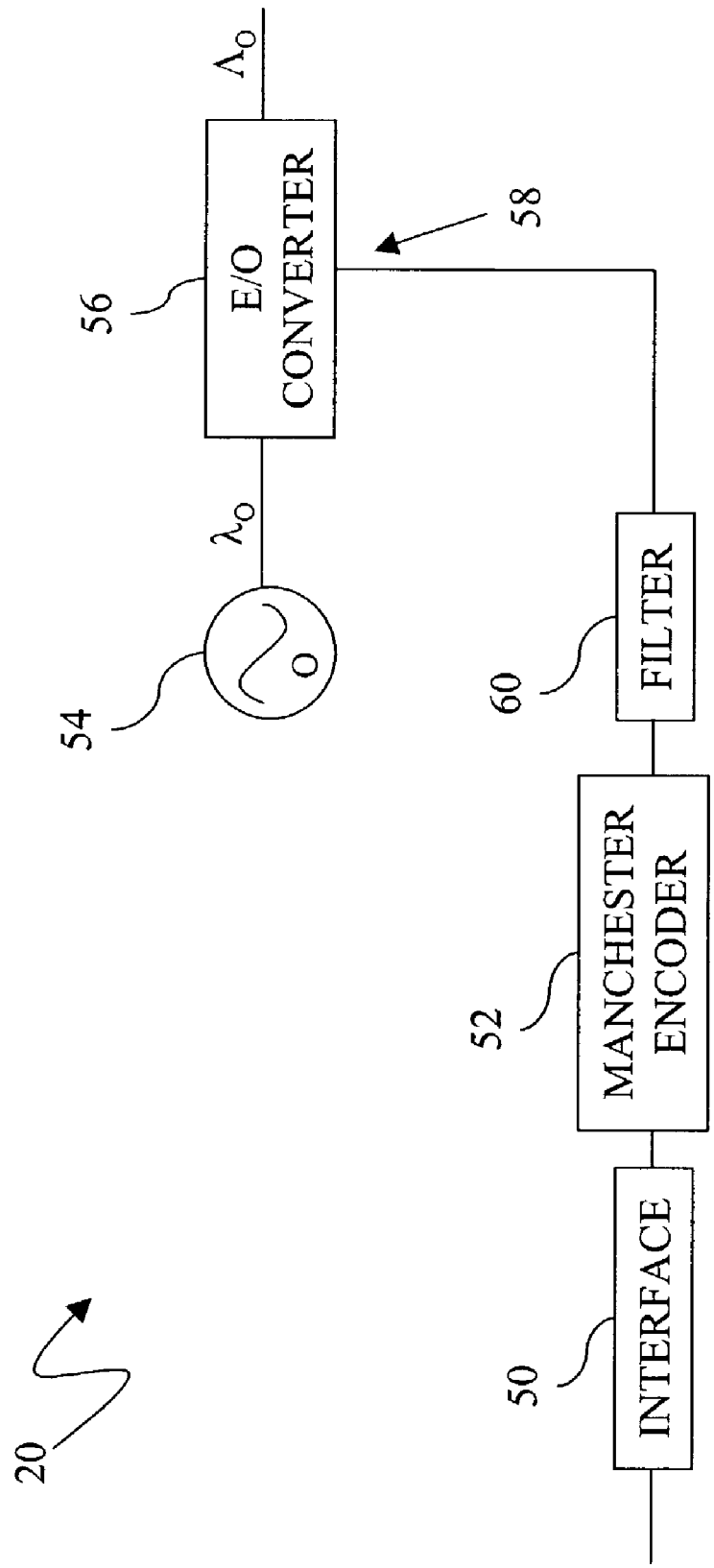
FIG. 7 shows another embodiment of the transmitter including a filter.

FIG. 7 shows another embodiment of the transmitter 20 including a filter 60 for the Manchester encoded signal spectrum. The filtered Manchester encoded signal allows for better performance by, for example, providing a filtered Manchester encoded signal having a frequency spectrum which is more symmetrical about the data rate frequency $f_d$ and more narrow, thereby requiring less bandwidth to transmit the same information. In some embodiments, the filter 60 may be omitted, such as when using a narrow band E/O converter 56 (e.g., a resonantly-enhanced modulator). The filter 60 may also be used to narrow the frequency spectrum in conjunction with other devices, such as differential encoders 69 described hereinbelow, to facilitate other functions, such as to facilitate duobinary encoding.

Figure 8:
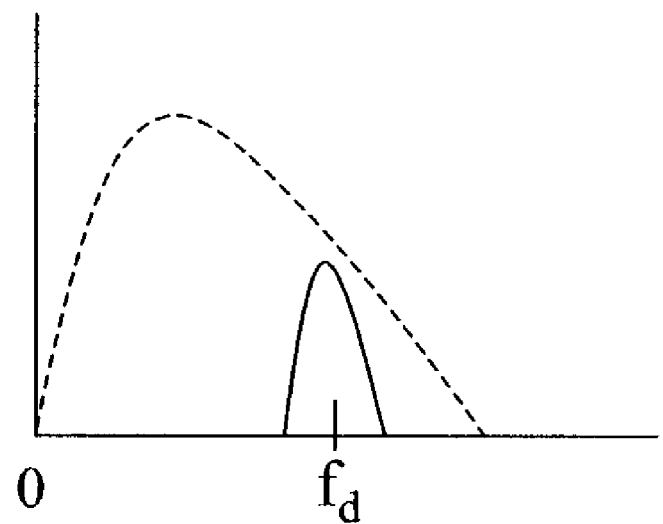
FIG. 8 shows one example of a frequency spectrum for a filtered Manchester encoded signal.

FIG. 8 shows a frequency spectrum for one example of the filtered Manchester encoded signal, with the unfiltered signal shown as a broken line.

Figure 9:
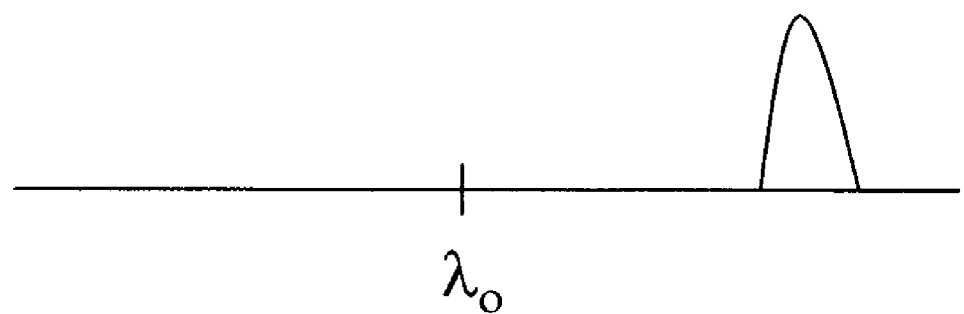
FIG. 9 shows one example of a frequency spectrum for an upconverted optical signal generated from the Manchester encoded signal of FIG. 8.

FIG. 9 shows a signal profile of the optical data signal $\lambda_o$ when the Manchester encoded data signal of FIG. 8 is input to the E/O converter 56. In that example, the sideband signal is more compact and, therefore, uses less bandwidth than the sideband generated from unfiltered Manchester encoded signals, thereby allowing for increased system performance.

Figure 10:
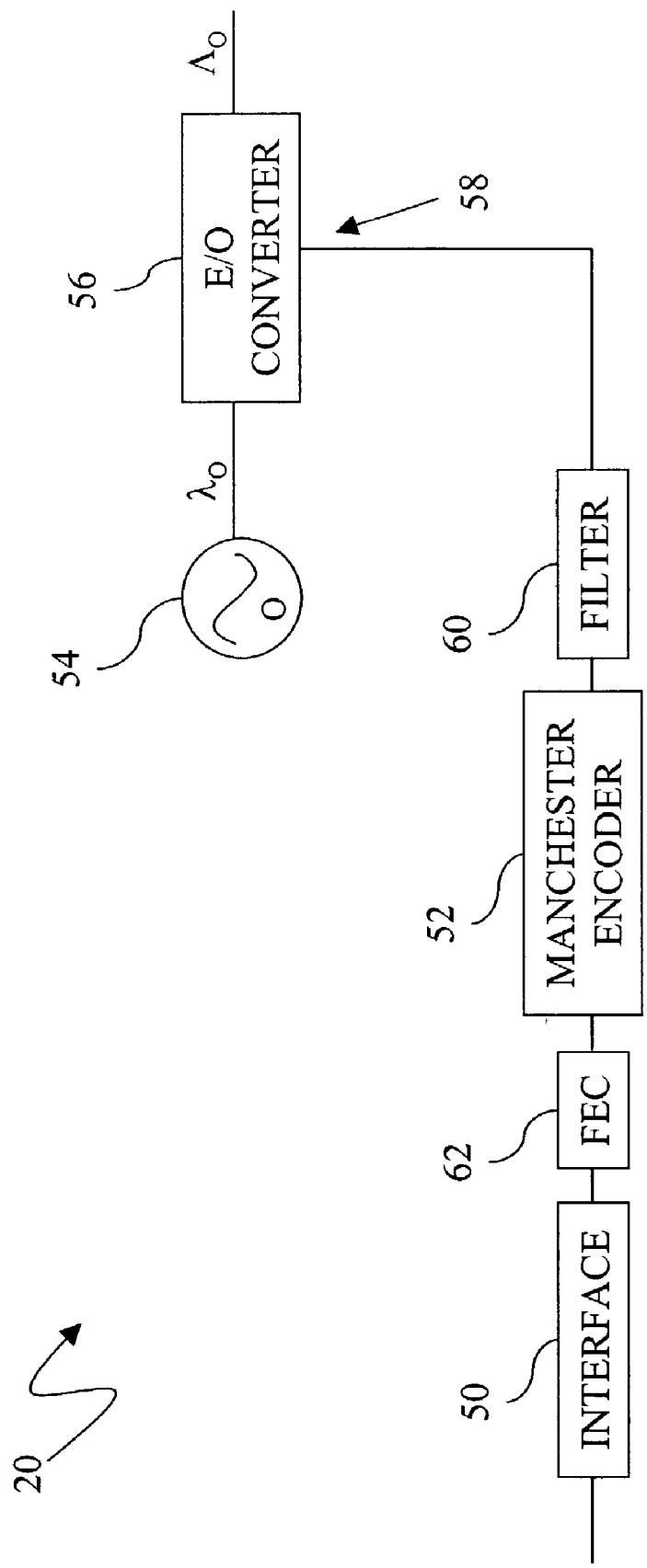
FIGS. 10 and 11 show additional embodiments of the transmitter.

FIG. 10 shows another embodiment of the transmitter 20 which includes a forward error correction ("FEC") encoder 62. The FEC encoder 62 can utilize, for example, a G.975 compliant (255,239) Reed-Solomon code, or another FEC code or coding scheme. The FEC encoder 62 will add non-information carrying and/or redundant data, sometimes referred to as "overhead", to the signal, thereby changing the bit rate and frequency spectrum of the Manchester encoded signal. A change in the bit rate and frequency spectrum of the Manchester encoded signals can change the location and frequency spectrum of the sidebands relative to the optical carrier $\lambda_o$. The amount of overhead added by the FEC encoder 62 will vary depending on the amount of FEC encoding performed on the data signals.

In other embodiments, the information can be parsed (or inverse multiplexed) into two or more streams that can be transmitted to the destination. The resulting parsed streams may be lower bit rate streams which can allow for signals to be transmitted over a greater distance without regeneration or with fewer regeneration sites. Alternatively, the signal may be parsed into two or more bit rate streams which are not lower bit rate signals than the received signal, such as when a signal is parsed into identical copies for redundant transport, or when additional information is added to the parsed signals so that the resultant bit rate is not lower. Parsing or inverse multiplexing, when applied to SONET signals constructed from lower bit rate SONET signals can be merely a demultiplexing of the high bit rate SONET signal into its low bit rate SONET components. The information being transmitted can be recovered from the lower bit rate signals without inverse demultiplexing the lower bit rate signals into the higher bit rate signal. Whereas, inverse multiplexing of concatenated SONET signals fragments the information, requiring the IM signals be inverse demultiplexed to recover the information. While inverse multiplexing is known in the art, there are difficulties with the schemes, particularly in concatenated data streams.

A primary difficulty with inverse multiplexing is that the inverse multiplexed data streams will travel from the origin through the optical systems at different rates causing a misalignment, or skew, of the data at the destination. In parallel optical systems, transmission path lengths for the inverse multiplexed signals are equalized as much as possible to lessen the skew between the signals. In WDM systems, while a common fiber is used, chromatic dispersion of the different wavelengths carrying the inverse multiplexed signals, as well as the mux/demux structure of the WDM system can greatly increase the skew.

Various methods can be applied to compensate for the skewing of inverse multiplexed signals. For example, U.S. Pat. No. 5,461,622 suggests using both framing and pointer bytes in SONET overhead to deskew the information. Unfortunately, the amount of skew introduced by the system 10 can vary with the system conditions, which can degrade the system performance, particularly in WDM systems. For example, variations in the wavelengths one or more of the transmitters used to transmit the inverse multiplexed signals can caused variations in the amount of skew in the system 10.

In one aspect of the present invention, the transmitters 20 are configured to upconvert two or more inverse multiplexed signals onto different subcarriers of a single optical carrier wavelength provide by a transmitter 20. The frequency spacing between subcarrier can be substantially less than between adjacent carriers, so as to greatly decrease the dispersion and resultant skew between the inverse multiplexed signals during transmission in WDM systems. In addition, transmitting the inverse multiplexed signals on subcarriers of a common optical carrier essentially eliminates path length differences introduced by WDM multiplexing schemes.

Various subcarrier modulation techniques can be employed to upconvert the inverse multiplexed data streams onto the subcarriers. Single sideband, suppressed carrier upconversion techniques can be used to minimize unwanted mirror image subcarrier and carrier wavelengths being transmitted along with the signal wavelengths. Although conventional double sideband, non-suppressed carrier, subcarrier modulation techniques also can be employed. An example of single sideband, suppressed carrier transmitters suitable for use in the present invention are described in commonly assigned copending U.S. application Ser. No. 09/185,820 filed Nov. 4, 1998, the disclosure of which is incorporated herein by reference.

The number of inverse multiplexed signals may or may not coincide with the number of subcarriers being upconverted on a single transmitter. When the number of inverse multiplexed signals does not correspond to the number of subcarriers, the inverse multiplexed signals can be upconverted onto two or more transmitters transmitting information that provide adjacent signal wavelengths in a wavelength channel plan. For example, placing two subcarriers on each of two adjacent carriers can decrease the dispersion and resultant skew between the inverse multiplexed signals by a factor of 2-3 times compared to the skew using four carriers.

Inverse multiplexing can be used to separate and transmit concatenated and unconcatentated higher bit rate information streams, e.g., OC-768c & OC-768, OC-192c & OC-192, etc. The inverse multiplexed signals can be framed with appropriate transmission overhead at lower bit rates to allow the inverse multiplexed signals to be deskewed and recombined into the higher bit rate signal at the end of the link. The deskewing can be performed using the framing A1 and A2 bytes in the transmission overhead or additional bytes, as previously discussed.

In various embodiments, the receivers are configured to coherently detect two or more of the subcarriers carrying the inverse multiplexed signals. Coherent detection of the subcarriers eliminates much of the path variability introduced by demultiplexing and direct detection of the inverse multiplexed signals. Coherent detection can be performed using a remnant of the carrier wavelength with or without a local oscillator providing a heterodyne signal. In various embodiments, the local oscillator can be locked using the remnant carrier wavelength to ensure proper tracking of any drift in the carriers and subcarriers during operation. In fact, a tunable local oscillator can provide additional flexibility in configuring receivers 22 in the system 10. In other embodiments, detection techniques other than coherent detection, such as direct detection, may be used.

Figure 11:
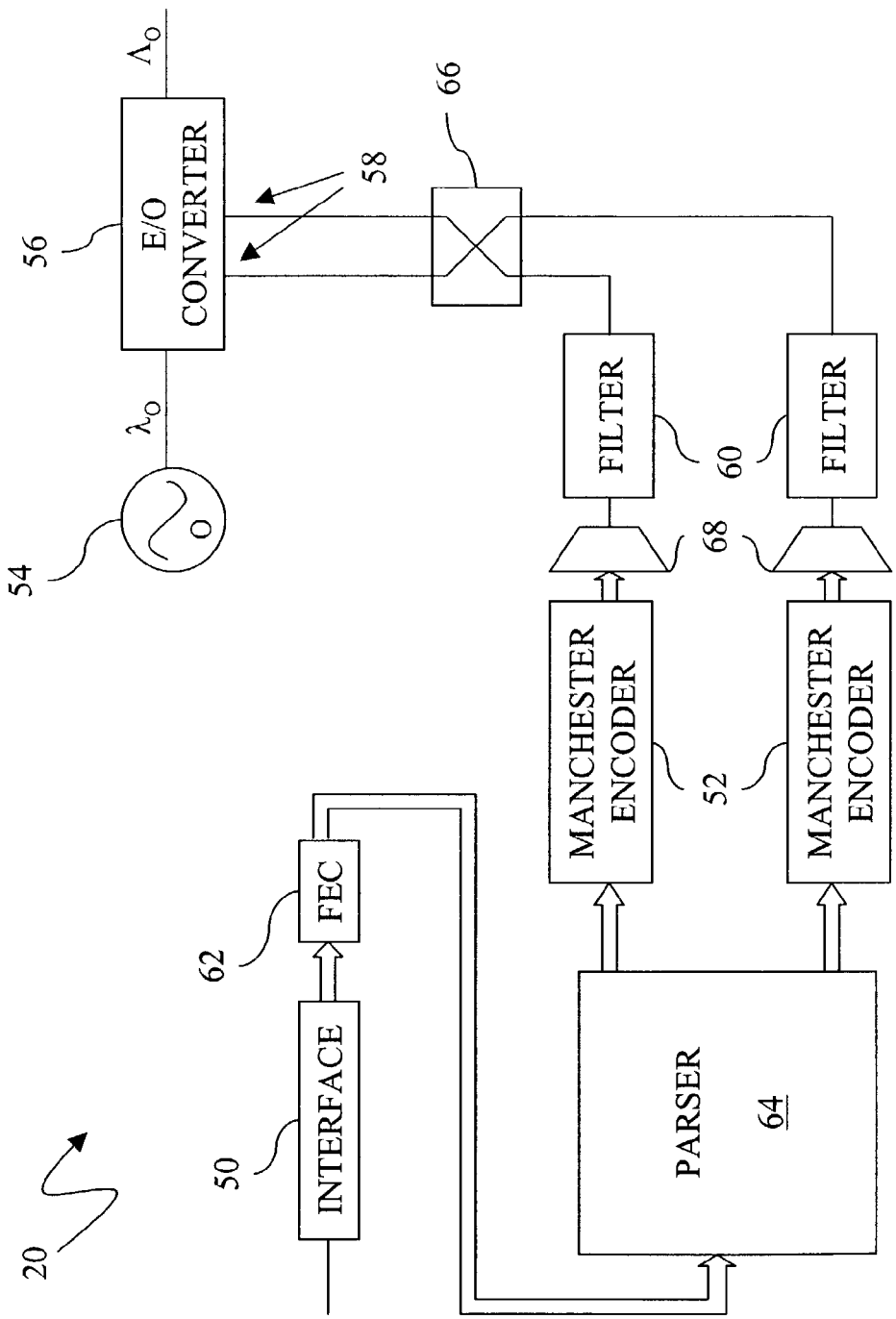

FIG. 11 shows another embodiment of the transmitter 20 including a parser 64 and a coupler 66. In that embodiment the parser 64 separates the data signal into two signals which are coupled before entering the E/O converter 56 such that the signals are upconverted onto separate sidebands of the optical carrier $\lambda_o$. The transmitter 20 can be used, for example, to transmit a high bit rate signal as two or more lower bit rate signals. Such a transmitter 20 is advantageous, for example, if a high bit rate signal is provided to a transmitter 20 but desired system performance, such as transmission distance, OSNR, etc., is not practical or cost effective with the higher bit rate signal. In that situation, the higher bit rate signal can be separated into two or more lower bit rate signals which can be recombined or assembled at the receiver 22.

The parser 64 in the illustrated embodiment separates the data signal into two data signals. In other embodiments of the transmitter 20, the parser 64 can separate the data signal into more than two data signals. The parser 64 can also utilize other parsing schemes, such as separating the data signal into two or more data signals having the same or different bit rates. The parser 64 can also separate the data signal at every bit, at every byte, at every several bits or bytes, or in other intervals, whether uniform or non-uniform. For example, the number of bits or bytes can vary with time or with some other function, such as a parameter of the data signal. Furthermore, the parser 64 can utilize redundancy in the data streams, such that some data is provided on more than one data stream, or no redundancy at all can be used. The parser 64 can include those and other variations and combinations of parsing schemes. In one example, the parser 64 separates a data stream onto two, lower bit rate data streams, and parses the data stream at each bit, sending one bit on one data stream, sending the next bit on the other data stream, and then repeating.

Figure 12:
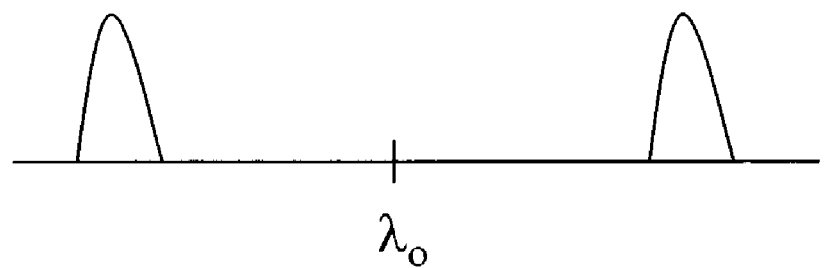
FIGS. 12 and 13 show other examples of frequency spectrums for upconverted optical signals

The coupler 66 in the illustrated embodiment is a two-by-two, ninety degree electrical coupler, such that the first output produces a signal similar to the signal at the second input plus a ninety degree phase shifted form of the signal at the first input, and the second output produces a signal similar to the signal at the first input plus a ninety degree phase shifted form of the signal at the second input. The coupler 66 couples and phase shifts the parsed data signals so that, for example, when each output of the coupler 66 is used to modulate an arm of a double parallel Mach-Zehnder interferometer or a similar device, each of the parsed signals will be upconverted onto a separate optical sideband, as shown in FIG. 12. Other variations of the electrical coupler 66 are also possible. For example, the coupler 66 can have different numbers of inputs and outputs, can induce different phase shifts, and can equally or unequally split and couple the signals to produce different kinds of optical signals.

Also in that embodiment, the interface 50 demultiplexes or "deserializes" the incoming data signal into several lower bit rate signals, which are provided by the interface 50 in parallel. Such deserializing of a signal can facilitate processing the signal, such as for FEC encoding and parsing. For example, in some circumstances it is more practical to perform parallel processing on two or more lower bit rate signals than it is to perform the same operation on a single, high bit rate signal. Some, none, or all of the data processing in the transmitter 20 can be performed with several parallel, lower bit rate signals. Multiplexers 68, sometimes referred to as "serializers", are also included in that embodiment to combine parallel data signals into a higher bit rate serial data signals.

FIG. 12 shows a signal profile of the optical data signal $\Lambda_o$ when the parsed and coupled data signals of FIG. 11 are input to the E/O converter 56. In that embodiment, one of the data signals is upconverted to a data signal at a longer wavelength than the optical carrier $\lambda_o$, the other sideband is upconverted to a sideband at a shorter wavelength than the optical carrier $\lambda_o$, and the optical carrier $\lambda_o$ is suppressed.

Figure 13:
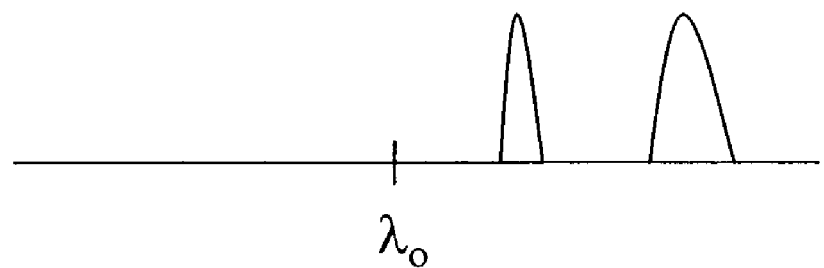

FIG. 13 shows another signal profile of the optical data signal $\Lambda_o$. That signal profile can be produced by an embodiment of the transmitter 20 in which the parser 64 separates the data signal into signals having different bit rates and, therefore, different frequencies. As a result, the different data signals will be offset differently from the optical carrier $\lambda_o$. Typically, the lower bit rate signal will also have more narrow frequency and wavelength spectrums. In other embodiments, the optical data signals can be on opposite sides of the optical carrier $\lambda_o$, and in other embodiments there can be more than two parsed data signals having more than two different bit rates.

Figure 14:
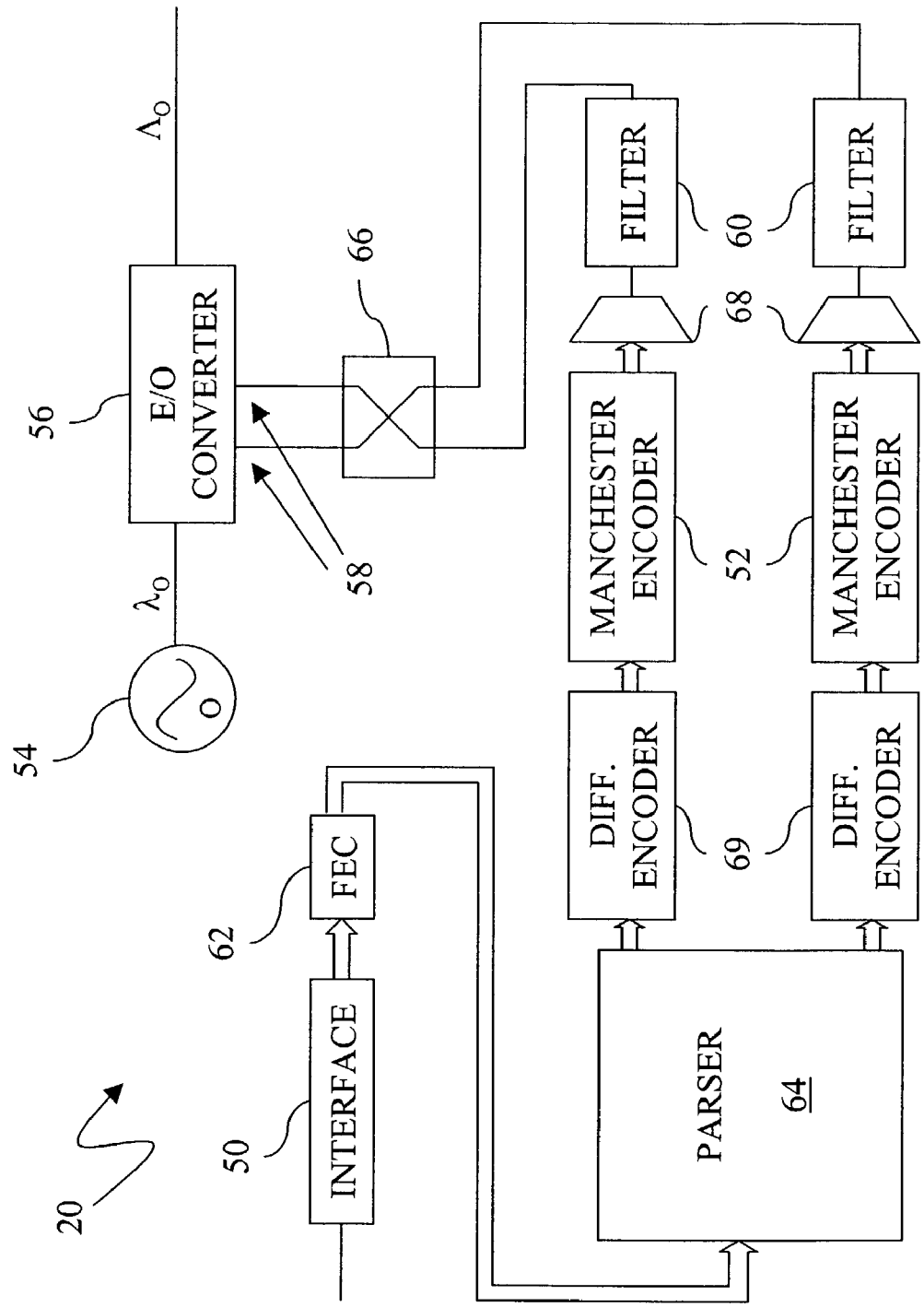
FIGS. 14 and 15 show other embodiments of the transmitter.

FIG. 14 shows another embodiment of the transmitter 20 including differential encoders 69. The parser 64, differential encoders 69, and Manchester encoders 52 can be implemented, for example, as one or more field programmable gate arrays, application specific integrated circuits, general purpose integrated circuits, or other integrated circuits. Furthermore, the differential encoders 69, as well as other devices, may be implemented in other embodiments of the invention, such as embodiments without the parser 64. Furthermore, the differential encoder may be replaced with other encoders, such as duobinary encoders.

Figure 15:
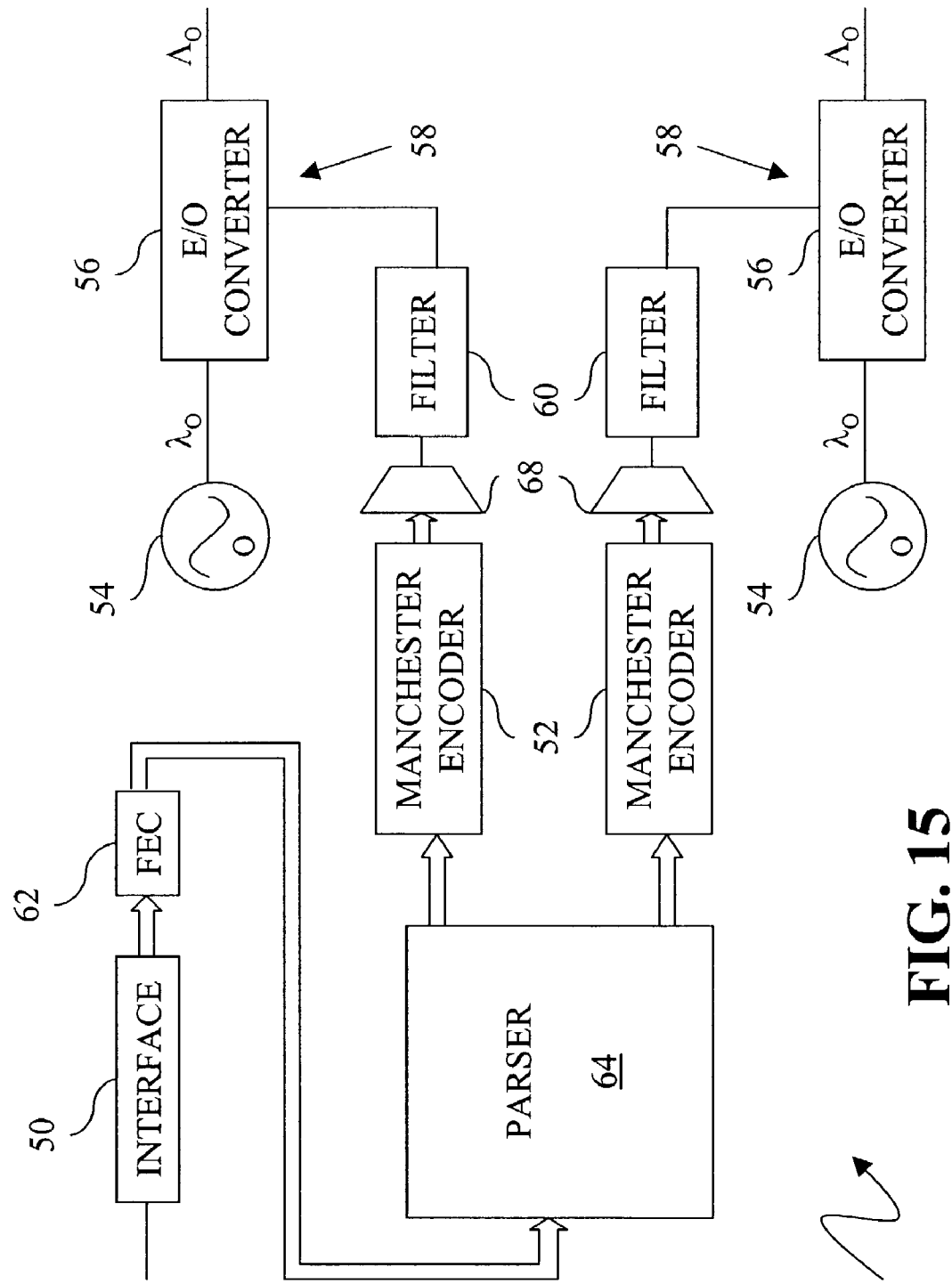

FIG. 15 shows another embodiment of the transmitter 20 in which the parser 64 is used and the coupler 66 is eliminated. In that embodiment, an optical carrier source 54 and an E/O converter 56 are provided for each parsed signal. For example, both parsed data signals can be provided at the same bit rate, but optical carriers $\lambda_o$ having different wavelengths can be used so that the data signals are upconverted onto different frequencies. In other embodiments, the optical carrier sources 54 can produce optical carriers $\lambda_o$ having the same wavelength and, for example, one parsed data signal can be upconverted onto a sideband having a longer wavelength than the optical carrier $\lambda_o$, and the other parsed data signal can be upconverted onto a sideband having a shorter wavelength than the optical carrier $\lambda_o$. In other embodiments, the parser 64 can separate the data signal into more than two signals, and more than two optical carrier sources 54 and an E/O converters 56 can also be used.

Figure 16:
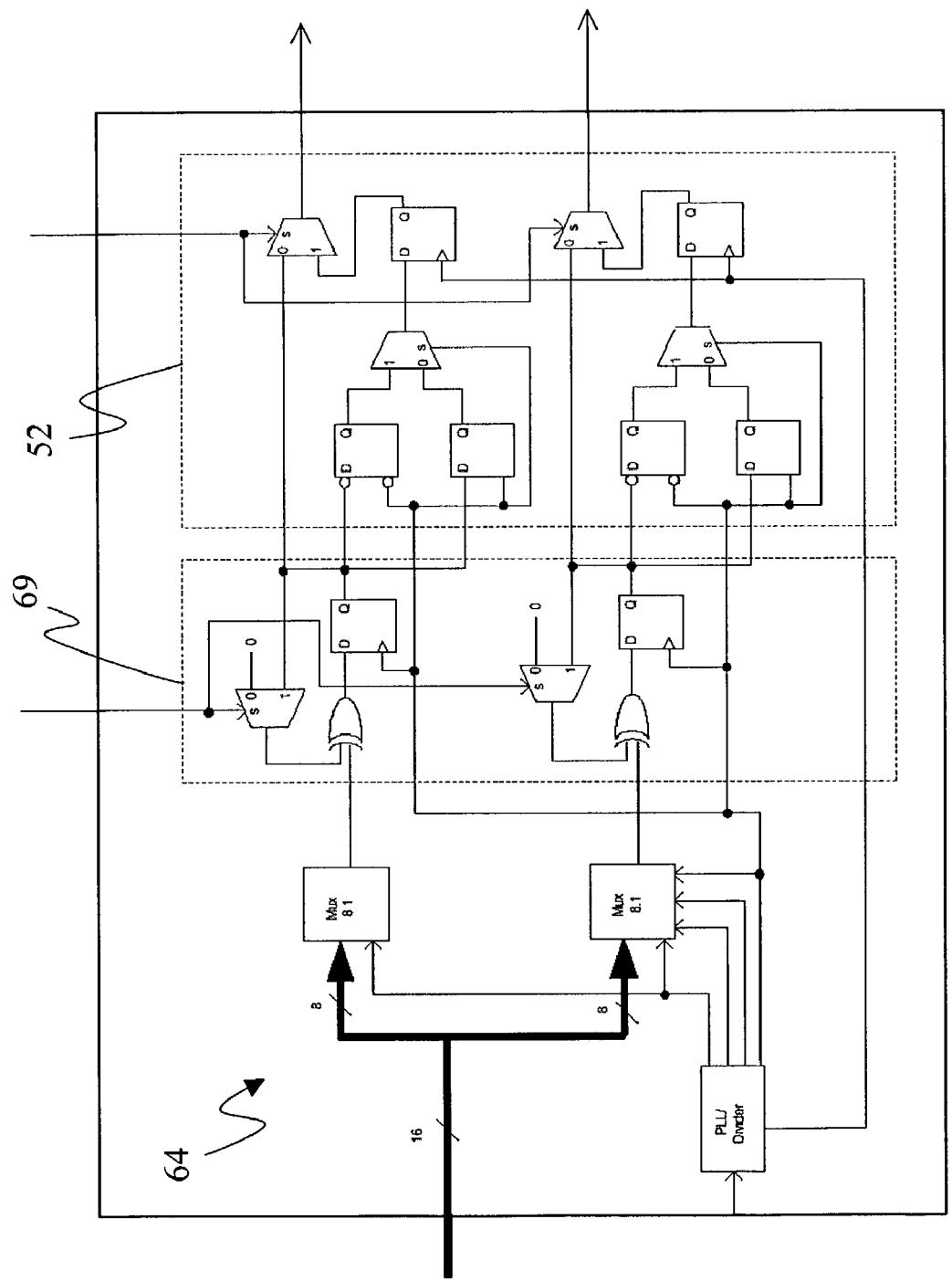
FIG. 16 shows a circuit schematic of one embodiment of the parser, Manchester encoders, and differential encoders.

FIG. 16 shows a circuit schematic of one embodiment of the parser 64, differential encoders 69, and Manchester encoders 52. That embodiment can be, for example, in the form of an integrated circuit, such as an application specific integrated circuit, a field programmable gate array, a general purpose integrated circuit, other integrated circuits, or discrete components.

Figure 17:
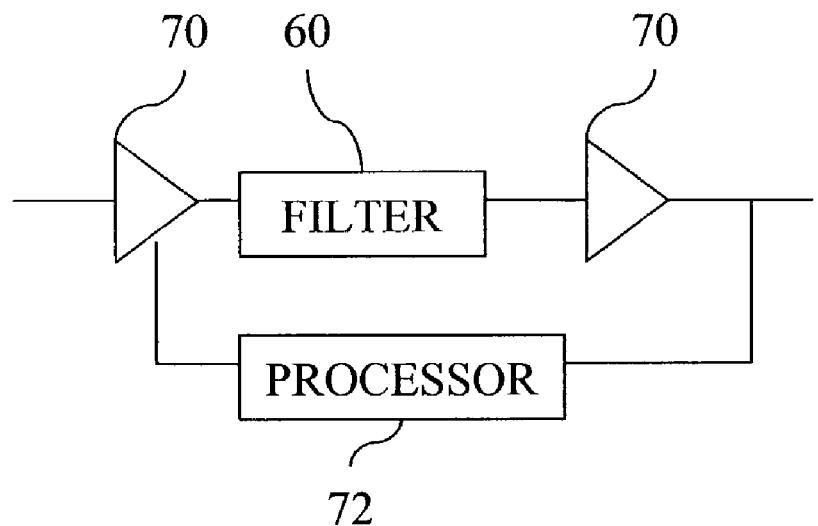
FIG. 17 shows another embodiment of the filter portion of the transmitter.

FIG. 17 shows another embodiment of a portion of the transmitter 20 around the filter 60. That embodiment includes a first amplifier 70 in front of the filter 60, a second amplifier 70 after the filter 60, and a feedback loop including a-processor 72. The first amplifier 70 and the feedback loop provide controlled signal gain to compensate for variations in the data signal. For example, one or more parameters (e.g., gain and gain profile) of the first amplifier 70 can be controlled through the feedback loop, which can include the processor 72 and/or other circuitry, such as an application specific integrated circuit, a general purpose integrated circuit, a field programmable gate array, and discrete components, to process the feedback signal and control the first amplifier 70. The second amplifier 70 provides additional gain, and it can be eliminated if sufficient gain is provided by the first amplifier 70. This embodiment can be modified, such as to utilize a feed-forward loop, to utilize more or less amplifiers 70, to vary the location of the amplifiers 70, etc.

Figure 24:
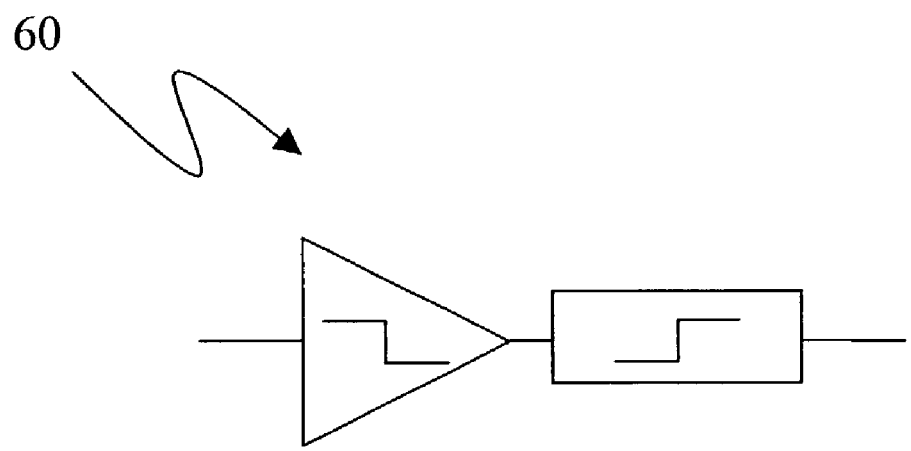
FIGS. 24 and 25 show several embodiments of filters which may be used with the present invention.

FIG. 24 illustrates one embodiment of the filter 60. In that embodiment, the filter 60 includes a low pass stage and a high pass stage which collectively act as a band pass filter. The low pass stage is illustrated as an amplifier, such as a gain limiting amplifier, and the high pass stage is illustrated as a passive filter, such as a passive Bessel filter, although other types of amplifiers, filters, or other devices may be used, and the filter may include active or passive stages. In some embodiments, the order in which the stages are arranged and the number of stages may be changed. In other embodiments, one or more of the amplifiers 70 illustrated in FIG. 17 may operate as one or more of the filter stages, such as the gain limiting amplifier. In other embodiments, the filter 60 may be a filter other than a band pass filter. The filter 60 may be used, for example, to facilitate duobinary encoding by selecting filter characteristics which compliment the differential encoder 69 or other devices.

Figure 18:
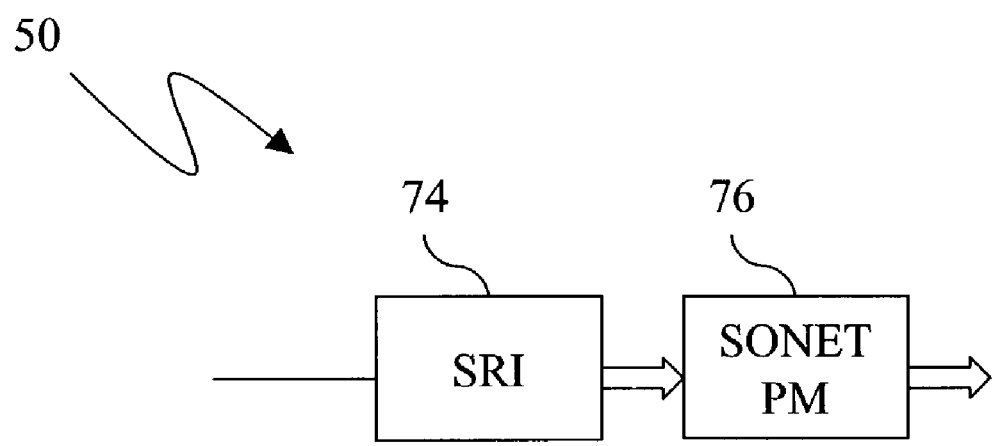
FIG. 18 shows one embodiment of the transmitter interface.

FIG. 18 shows an embodiment of the transmitter interface 50 including a short reach interface ("SRI") receiver 74 and a SONET performance monitor 76. In the illustrated embodiment, the SRI 74 converts the incoming data signal into two or more parallel, lower bit rate signals. For example, the SRI can convert an optical OC-192 signal into sixteen parallel, 622 Mbps electrical signals. The SONET performance monitor 76, for example, can perform section monitoring and termination functions.

Figure 19:
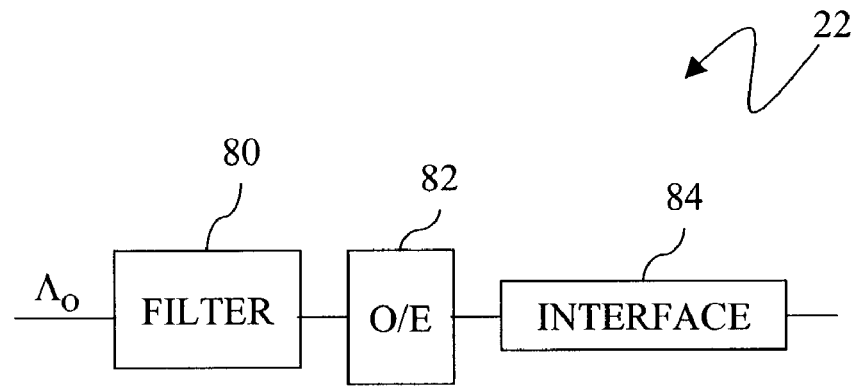
FIGS. 19-22 shows several embodiments of a receiver.

FIG. 19 shows a receiver 22 including a filter 80, an optical to electrical ("O/E") converter 82, and an interface 84. That receiver 22 can receive the optical data signals generated by the transmitters 20 of the present invention without the need for Manchester, differential, or duobinary decoders. The receiver 22 can also include other features, such as FEC decoding, assembling two or more data signals, automatic gain control ("AGC"), clock and data recovery ("CDR"), deserializing, etc.

The filter 80 filters one or more signals from the incoming optical data signal $\Lambda_o$. For example, in a WDM system 10 the filter can be used to select among the several signals and to reduce the noise in the optical data signal $\Lambda_o$, while in a single channel system 10 the filter 80 can be used to filter noise. In some embodiments, such as single channel systems where noise is not of concern, the filter 80 can be eliminated. The filter 80 can be a single stage or multiple stage filter, can be a single pass or a multiple pass filter, and can utilize one or more types of filters. For example, the filter 80 can have one stage including one or more fiber Bragg gratings and another stage including one or more Mach-Zehnder interferometric filters. The filter 80 can also include other types of filters, such as a fiber Bragg Fabry-Perot filter, a notched filter, a phase shifted filter, a bulk grating, etc., and can, for example, provide one or more filtered signals to one or more receivers 22. Many other types and combinations of filters 80 are also possible.

The O/E converter 82 converts the optical data signal $\Lambda_o$ into one or more corresponding electrical signals. The interface 84 provides a connection for data being received and is analogous to the interface 50 in the transmitter 20.

Figure 20:
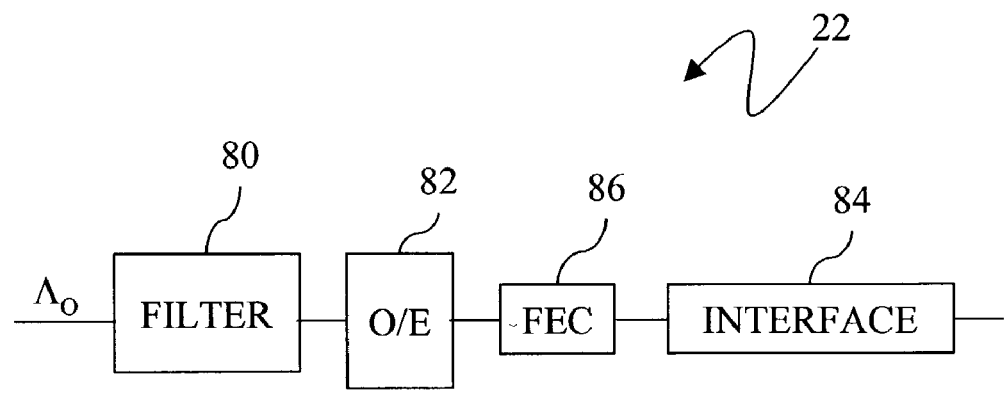

FIG. 20 shows another embodiment of the receiver 22 including a FEC decoder 86. That receiver 22 can be used to receive data signals which are FEC encoded, such as can be transmitted by the transmitter 20 illustrated in FIG. 10.

Figure 21:
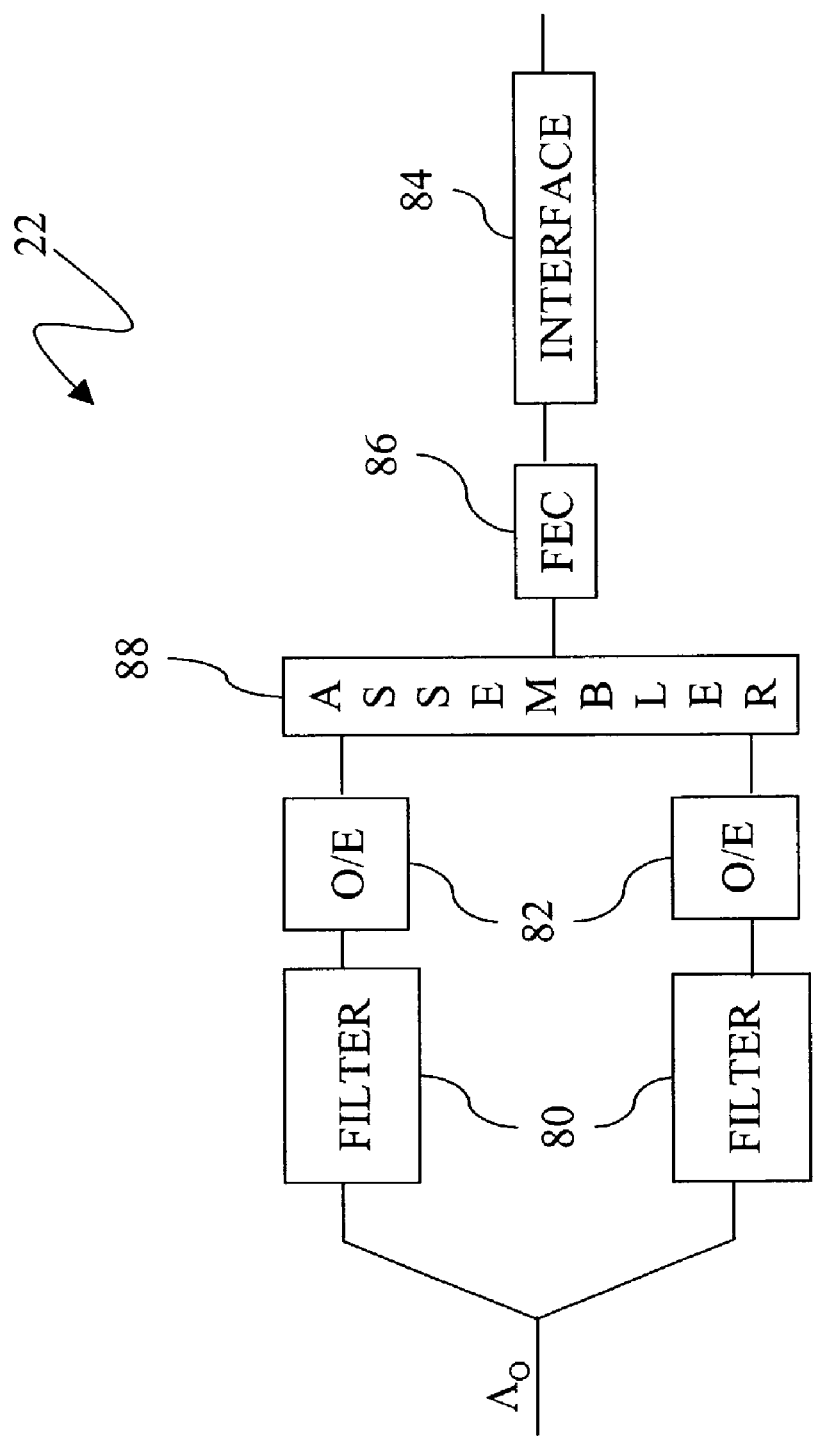

FIG. 21 shows another embodiment of the receiver 22 including an assembler 88 that can be used to receive separated data signals, such as those transmitted by the transmitter 20 illustrated in FIG. 11. In that embodiment, the received optical signal is split between two filters 80, each of which filters one of the signals to be received. In other embodiments, the separate filters 80 can be replaced by a single filter (e.g. a bulk grating or an arrayed waveguide) which can separate from the incoming signal $\Lambda_o$ the two or more data signals of interest. The filtered signals are converted to electrical form by the O/E converters 82, and the electrical signals are combined by the assembler 88. In other embodiments, more than two signals can be assembled. The illustrated embodiment also includes a FEC decoder 86 which decodes the forward error correction encoded signals.

Figure 22:
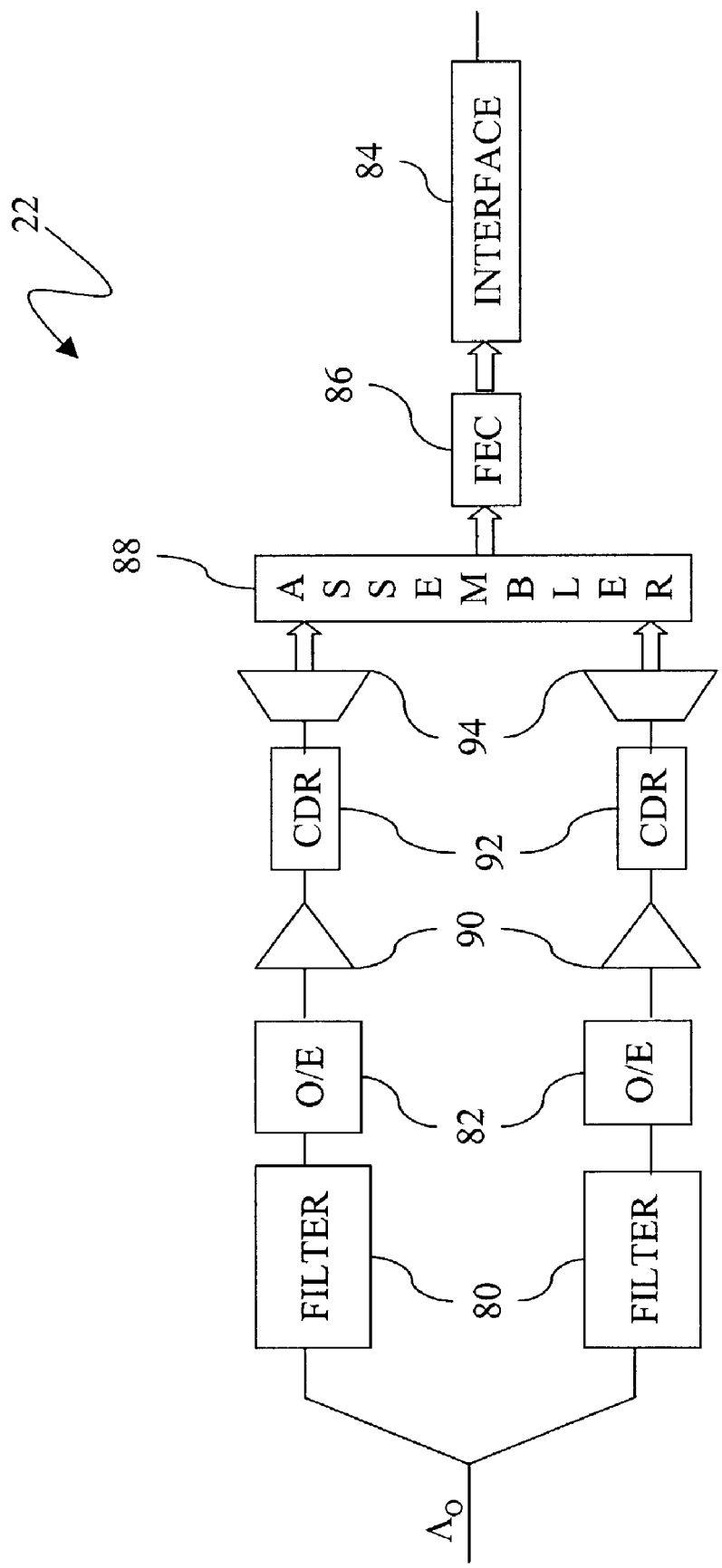

FIG. 22 shows another embodiment of the receiver 22 that includes automatic gain controllers ("AGC") 90, clock and data recovery ("CDR") circuits 92, and demultiplexers 94, which are sometimes referred to as "deserializers". The demultiplexers 94 separate a serial data signal into plural lower bit rate data signals, which are assembled by the assembler 88. The assembler 88 produces the assembled data as several separate data signals which are FEC decoded and combined into a single signal by the interface 84. The demultiplexing or deserializing of the data signal into several lower bit rate signals facilitates further processing of the signal, such as assembling and FEC decoding. For example, in some circumstances it is more practical to perform parallel processing on several lower bit rate signals than it is to perform the same operation on a single, high bit rate signal. Some or all of the data processing in the receiver 22 can be done with several parallel low bit rate signals.

Figure 23:
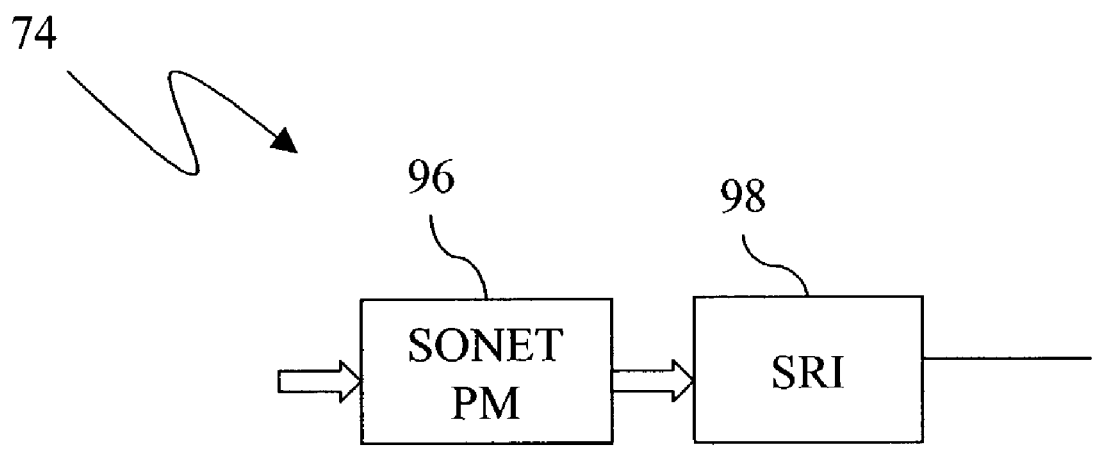
FIG. 23 shows one embodiment of the receiver interface.

FIG. 23 shows an embodiment of the receiver interface 74 including a SONET performance monitor 96 and a short reach interface ("SRI") transmitter 98. The SONET performance monitor 96, for example, can perform section monitoring and termination functions. The SRI 98 combines the parallel data signal into a higher bit rate, serial signal. The receiver interface 74 is analogous to the transmitter interface 50.

Figure 25:
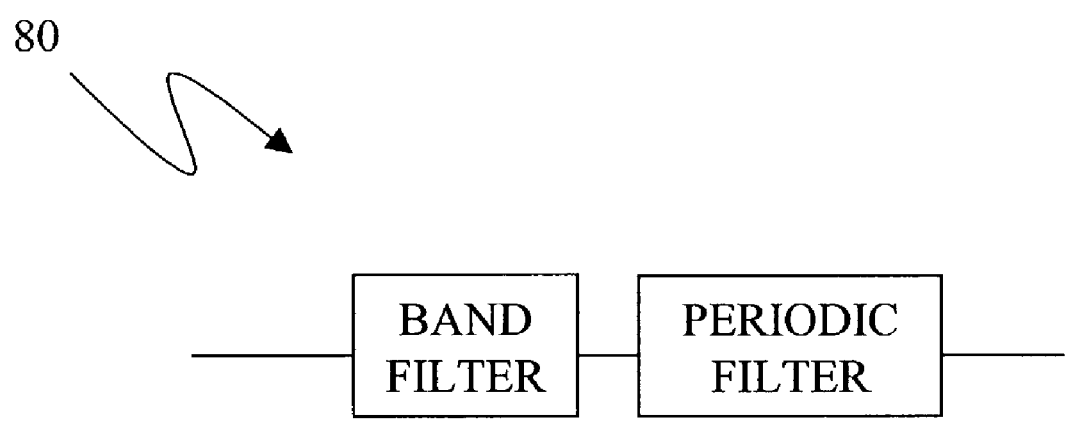

FIG. 25 illustrates one embodiment of a filter 80 which may be used, for example, in the receiver 22. In that embodiment, the filter 80 includes one periodic filter stage, such as a Mach-Zehnder filter, and one band filter, such as a Bragg grating filter. Other types of periodic and band filters may be used in the filter 80. In other embodiments, the order of the stages may be different, the filter 80 may include more or less stages, different types. of stages, and different types of filters.

Many variations and modifications can be made to the present invention without departing from its scope. For example, advantages of the present invention can be realized with different numbers, configurations, and combinations of components in the transmitters 20 and receivers 22. Similarly, different numbers and forms of electrical and optical data signals can also be utilized with the present invention. Many other variations, modifications, and combinations are taught and suggested by the present invention, and it is intended that the foregoing specification and the following claims cover such variations, modifications, and combinations.

The invention claimed is:

1. A method of transmitting an optical communications signal, comprising:
   receiving a first signal;
   encoding the signal with an encoding scheme selected from a group consisting of differential encoding and duobinary encoding to produce an encoded signal having a bit rate;
   encoding the signal with an oscillating signal component to produce a Manchester encoded signal having a frequency component equal to the bit rate of the encoded signal; and
   modulating an optical carrier signal, wherein the optical carrier signal has an optical carrier frequency, with the Manchester encoded signal and producing a sub-carrier modulated optical signal indicative of the first signal, and wherein the sub-carrier modulated optical signal is offset from the optical carrier frequency of the optical carrier signal by a frequency equal to the bit rate of the encoded signal.

2. The method of claim 1, further comprising narrowing the signal spectrum after encoding the signal with an oscillating signal component.

3. The method of claim 2, wherein narrowing the signal spectrum includes band filtering the signal.

4. The method of claim 2, wherein differential encoding is performed before encoding the signal with an oscillating signal component, and narrowing the signal spectrum is performed after encoding the signal with an oscillating signal component.

5. The method of claim 1, wherein encoding the signal with an oscillating signal component includes modulation electrical carriers with the signal.

6. The method of claim 1, further comprising parsing the signal into a plurality of parsed signals.

7. The method of claim 6, further comprising coupling and phase shifting the parsed signals before sub-carrier modulating.

8. The method of claim 7, wherein modulating an optical carrier signal includes subcarrier modulating the signals onto subcarriers of a single optical carrier source.

9. The method of claim 6, wherein parsing the signal includes parsing the signal into a plurality of parsed signals having the same bit rates.

10. The method of claim 6, wherein parsing the signal includes parsing the signal into a plurality of parsed signals having different bit rates.

11. The method of claim 6, wherein modulating an optical carrier signal includes subcarrier modulating the signals onto subcarriers of different optical carrier sources.

12. The method of claim 1, further comprising splitting the signal into a plurality of signals and introducing a relative phase shift.

13. The method of claim 1, further comprising receiving the sub-carrier and converting the sub-carrier into a signal corresponding to the first signal without differential decoding, or duobinary decoding, or Manchester decoding the sub-carrier.

14. An optical transmitter, comprising:
    a differential encoder receiving a first signal and producing a differentially encoded signal having a bit rate;
    a Manchester encoder receiving the differentially encoded signal from the differential encoder and producing a Manchester encoded signal having a frequency component equal to the bit rate of the differentially encoded signal;
    a frequency spectrum narrowing filter receiving the Manchester encoded signal from the Manchester encoder;
    an electrical to optical converter receiving an electrical signal from the filter and producing a sub-carrier modulated optical signal indicative of the first signal, wherein the electrical to optical converter has an optical carrier frequency, and wherein the sub-carrier modulated optical signal is offset from the optical carrier frequency of the electrical to optical converter by a frequency equal to the bit rate of the differentially encoded signal.

15. The transmitter of claim 14, further comprising a coupler connected between the filter and the electrical to optical converter for splitting and phase shifting the signal.

16. The transmitter of claim 14, further comprising: a parser connected before the differential encoder for parsing the signal into a plurality of parsed signals; and
    corresponding differential encoders, Manchester encoders, frequency narrowing filters, and electrical to optical converters for the plurality of parsed signals.

17. The transmitter of claim 16, wherein the electrical to optical converter subcarrier modulates a plurality of signals onto a plurality of sub-carriers of a single optical carrier source.

18. The transmitter of claim 16, further comprising a plurality of optical to electrical converters, wherein signals are sub-carrier modulated onto sub-carriers of a plurality of optical carrier sources.

19. The transmitter of claim 16, wherein the parser parses the signal into a plurality of equal bit rate parsed signals.

20. The transmitter of claim 16, wherein the parser parses the signal into a plurality of unequal bit rate parsed signals.

* * * * *